UNITED STATES PATENT OFFICE.

AUGUST LEOPOLD LASKA, OF OFFENBACH-ON-THE-MAIN, GERMANY, ASSIGNOR TO CORPORATION OF CHEMISCHE FABRIK-GRIESHEIM-ELEKTRON, OF FRANKFORT-ON-THE-MAIN, GERMANY.

VIOLET COTTON-DYES.

1,049,109.  Specification of Letters Patent.  Patented Dec. 31, 1912.

No Drawing.  Application filed August 27, 1912. Serial No. 717,244.

*To all whom it may concern:*

Be it known that I, AUGUST LEOPOLD LASKA, doctor of philosophy, chemist, a citizen of the German Empire, and resident of Offenbach-on-the-Main, in the Grand Duchy of Hesse, Germany, with post-office address Wilhelmsplatz 18, have invented new and useful Improvements in Violet Cotton-Dyes, of which the following is a specification.

By my invention very valuable violet cotton-dyes are obtained by combining the tetrazo derivative of the meta-meta'-disulfonic acid of para-para'-diamino-diphenylurea with two molecules of a 2-arylamido-5-naphthol-7-sulfonic acid in alkaline solution.

The new dyestuffs probably have the formula:

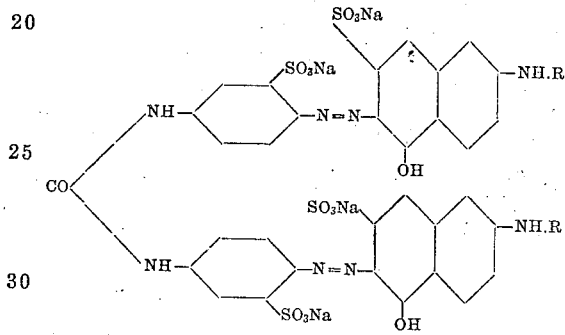

wherein R means an aromatic radical; they dye cotton very pure violet shades, fast to light.

In practising the new process I may proceed as follows the parts being by weight:

Example: 45 parts of the normal sodium salt of the meta-meta'-disulfonic acid of para-para'-diamino-diphenylurea are diazotized in the usual manner by means of 57 parts of hydrochloric acid of 20° Baumé specific gravity and 14 parts of sodium nitrite. The tetrazo compound, thus obtained, is poured into a solution of 68 parts of the sodium salt of 2-phenyl-amino-5-naphthol-7-sulfonic acid, maintained alkaline until the combination is finished. When the production of the dyestuff is complete, the mixture is heated to 60° C., and the dyestuff is precipitated by adding salt. It yields, when dry, a brownish black powder, soluble in concentrated sulfuric acid to a violet blue solution, in water to a reddish violet solution. From this solution the dyestuff is precipitated by concentrated hydrochloric acid in bluish violet flakes. It dyes cotton very pure reddish violet shades, coloring only a little on soaping also washed white cotton.

Upon reduction with stannous chlorid and hydrochloric acid the dyestuffs yield meta-meta'-disulfonic acid of para-para'-diamino-diphenyl-urea and 2-arylamino-5-oxy-6-amino-naphthalene-7-sulfonic acid. A like procedure may be adopted when making dyestuffs from other 2-arylamino-5-naphthol-7-sulfonic acids.

Now, what I claim and desire to secure by Letters Patent, is the following:

1. As new products, the herein described azo dyes, having probably the formula:

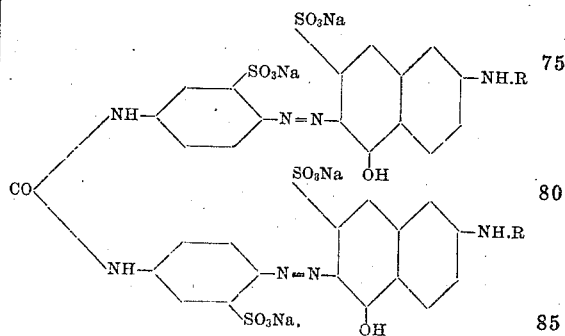

wherein R means an aromatic radical, the said azo dyes being brownish black powders, soluble in concentrated sulfuric acid to a violet blue solution, in water to a reddish blue solution, dyeing cotton very pure violet shades and yielding upon reduction with stannous chlorid and hydrochloric acid the meta-meta'-disulfonic acid of para-para'-diamino-diphenyl-urea and 2-arylamino-5-oxy-6-amino-naphthalene-7-sulfonic acid.

2. As a new product the herein described azo dyestuff, having probably the formula:

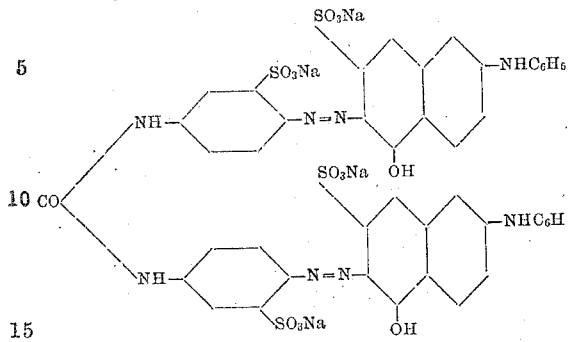

the said dyestuff being a brownish black powder, soluble in concentrated sulfuric acid to a violet blue solution, in water to a reddish blue solution, dyeing cotton very pure violet shades and yielding upon reduction with stannous chlorid and hydrochloric acid the meta-meta'-disulfonic acid of para-para'-diamino-diphenyl-urea and 2-phenylamino-5-oxy-6-amino-naphthalene-7-sulfonic acid.

In testimony, that I claim the foregoing as my invention, I have signed my name in presence of two witnesses, this 14th day of August 1912.

AUGUST LEOPOLD LASKA.

Witnesses:
  PETER LAUTENSCHLÄGER,
  FRITZ DÉSOR.

---

Copies of this patent may be obtained for five cents each, by addressing the "Commissioner of Patents, Washington, D. C."